US006841018B2

(12) United States Patent
Pituch et al.

(10) Patent No.: US 6,841,018 B2
(45) Date of Patent: Jan. 11, 2005

(54) LABEL RECONCILIATION DEVICE AND METHOD

(76) Inventors: Thomas Pituch, 19 Huntington Circle Dr., Medford, NJ (US) 08055; Thomas Basgil, 602 Woodland Ave., Cinnaminson, NJ (US) 08077

( * ) Notice: Subject to any disclaimer, the term of this patent is extended or adjusted under 35 U.S.C. 154(b) by 0 days.

(21) Appl. No.: 10/606,215

(22) Filed: Jun. 25, 2003

(65) Prior Publication Data

US 2004/0000369 A1 Jan. 1, 2004

Related U.S. Application Data

(60) Provisional application No. 60/392,536, filed on Jun. 28, 2002.

(51) Int. Cl.[7] .......................... B32B 31/20; B32B 35/00

(52) U.S. Cl. .......................... 156/64; 156/249; 156/285; 156/324; 156/351; 156/378; 156/537; 156/DIG. 24; 156/DIG. 28; 156/DIG. 33

(58) Field of Search .......................... 156/64, 230, 234, 156/238, 247, 249, 285, 287, 289, 324, 344, 350, 351, 361, 362, 363, 378, 537, 538, 540, 584, DIG. 24, DIG. 8, DIG. 33

(56) References Cited

U.S. PATENT DOCUMENTS 5,405,482 A * 4/1995 Morrissette et al. ........ 156/364
6,450,227 B1 * 9/2002 Labardi ...................... 156/351

* cited by examiner

*Primary Examiner*—Melvin C. Mayes
*Assistant Examiner*—Sing Po Chan
(74) *Attorney, Agent, or Firm*—Donald C. Simpson

(57) ABSTRACT

A method and means for reconciliation between incorrect/faulty labels identified during a labeling operation and incorrect/faulty labels removed from the operation.

2 Claims, 5 Drawing Sheets

LABEL RECONCILIATION DEVICE AND METHOD

CROSS-REFERENCE TO RELATED APPLICATIONS

This patent application is based on Provisional Patent Application Ser. No. 60/392,536 filed Jun. 28, 2002, the filing date of which is hereby claimed.

BACKGROUND OF THE INVENTION

There are a number of labeling systems adapted to apply pressure-sensitive labels to articles or containers at a label-applying station. A typical prior art system is illustrated schematically in FIG. 1. Labels (1) are carried initially by a web (2) with the adhesive side of the label facing toward the web, and the adhesive holding the label to the web. The labels are delivered to a vacuum drum (7) following stripping from the web (2) at a label pick-up station (5), and deposited on the vacuum drum (7). The vacuum drum (7) continuously advances the stripped labels in a given direction to meet articles to be labeled (3) at a label-applying station (4). Simultaneously, articles to be labeled (3) are continuously advanced past the label applying station (4).

The speed of advance of the articles to be labeled 3 and the speed of advance of the web (2) are sensed continuously by electronic means, and the speed of advance of the web (2) is adjusted as necessary to match the speed of advance of the articles to be labeled (3). In FIG. 1, the articles to be labeled (3) are rotating as they contact the adhesive surface of the label at label applying site (4), thereby fixing the label to the article to be labeled (3). Some of the prior art devices utilize a pressure-sensitive labeler with an intermediately moving web. More recent devices utilize a continuously moving web pressure-sensitive labeler. Typical examples of these various devices will be found in U.S. Pat. Nos. 4,842,660; 4,687,535; and 5,256,239.

The aforementioned patents, while describing effective labeling systems and equipment, are not perfect and, on occasion, "incorrect" or faulty labels may be applied to containers. Incorrect/faulty labels are wrong labels or labels with poor or illegible lot numbers or expiration dates and/or incorrect bar code or part numbers. This is a matter of particular concern to packagers of pharmaceuticals. An incorrectly labeled pharmaceutical container could lead to a costly product recall, and might result in serious injury or even death. The end user relies on the label to take medicine according to a doctor's instructions and could, in fact, be taking the wrong medicine or following wrong directions with adverse results. Accordingly, equipment and systems have been developed for detecting the presence of incorrect/faulty labels. This detection may occur both prior to labeling and subsequent to labeling, or both: U.S. Pat. Nos. 2,551,364 and 4,662,971 are examples of labeling equipment that provide error detection prior to application of the labels.

U.S. Pat. No. 5,405,482 describes an advance over the aforementioned patents in that the scanning and removal of incorrect/faulty labels can be conducted without interrupting the essentially continuous operation of the labeling equipment. The label scanner (8) is positioned to "read" the labels while they are still positioned on the carrier web, just prior to the label pick-up station (5) and vacuum roll (7) which will remove the label from the web. A "bad" label-removal unit is positioned between the vacuum roll label pick-up point (5) and the point (4) at which the vacuum roll normally releases and applies a label to a container (3) and is controlled by information from the scanning unit (8) such that when an incorrect label is identified by the scanner, the information is transmitted to and actuates a label-removing device. It is only necessary that the rate and time of label travel be coordinated so that the label removed is the detected incorrect label and not one of the proper labels. There are some serious drawbacks to the detection system of U.S. Pat. No. 5,405,482. As noted in the patent, the adhesive strength of the label coating overcomes the vacuum strength of the vacuum drum such that the incorrect label is wrapped around the removal roller of the label removal device. These removed labels accumulate on the removal roller and eventually must be removed from the roller by a machine operator. In this regard, see U.S. Pat. No. 5,405,482, column 3, lines 51–54, and column 4, lines 12–14. Because these labels are strongly adhered to each other, they are not readily separated from each other for individual reconciliation and one must depend on the weight of the accumulated, adhered block of labels relative to the weight of a single label for reconciliation purposes, a procedure that is inherently inaccurate and/or inefficient.

The deficiency in the system of U.S. Pat. No. 5,405,482 and all the previously discussed patents is the absence of means for detecting, isolating, and reconciling incorrect/faulty labels prior to label application. In dealing with something as sensitive as pharmaceuticals, one must consider the serious dangers inherent in the fact that any mechanical system may go out of adjustment. Under such circumstances, it is possible that the label removed is not the label that the scanner detected as incorrect, with the result that a correct label is removed and the incorrect/faulty label continues on into the system. In U.S. Pat. No. 5,405,482, at column 4, lines 18–19, it is noted that "unlabeled bottles are easily thereafter identified by operating personnel and may even be reused." While such detection procedures make identification of the skipped unlabeled container relatively easy, they do not provide an easy and efficient reconciliation between incorrect/faulty labels identified and incorrect/faulty labels removed. It is difficult to impossible for the operator to peel off individual labels from the adhered block of accumulated label faults on the label-remover roll and examine them individually for faults or for reconciliation. Further, by the time the roller has been cleared of the accumulated, adhered "incorrect" or faulty labels, and a reconciliation attempted, a container with an incorrect/faulty label, which through error in the detection process, may be far down the line, and mixed in with the large number of labeled containers coming off the labeling line.

BRIEF SUMMARY OF THE PRESENT INVENTION

The present invention provides all of the advantages of the foregoing patented devices and, in addition, provides a means for accurate, rapid reconciliation between the incorrect/faulty labels scanned and the incorrect/faulty labels removed. The device and system of the present invention further has the capability of being adapted to stop the system automatically in the rare event that an incorrect/faulty label is scanned in advance of application to a container but a correct label has, through inadvertence, been removed, rather than an incorrect/faulty label.

DETAILED DESCRIPTION OF THE INVENTION

Figure 1:
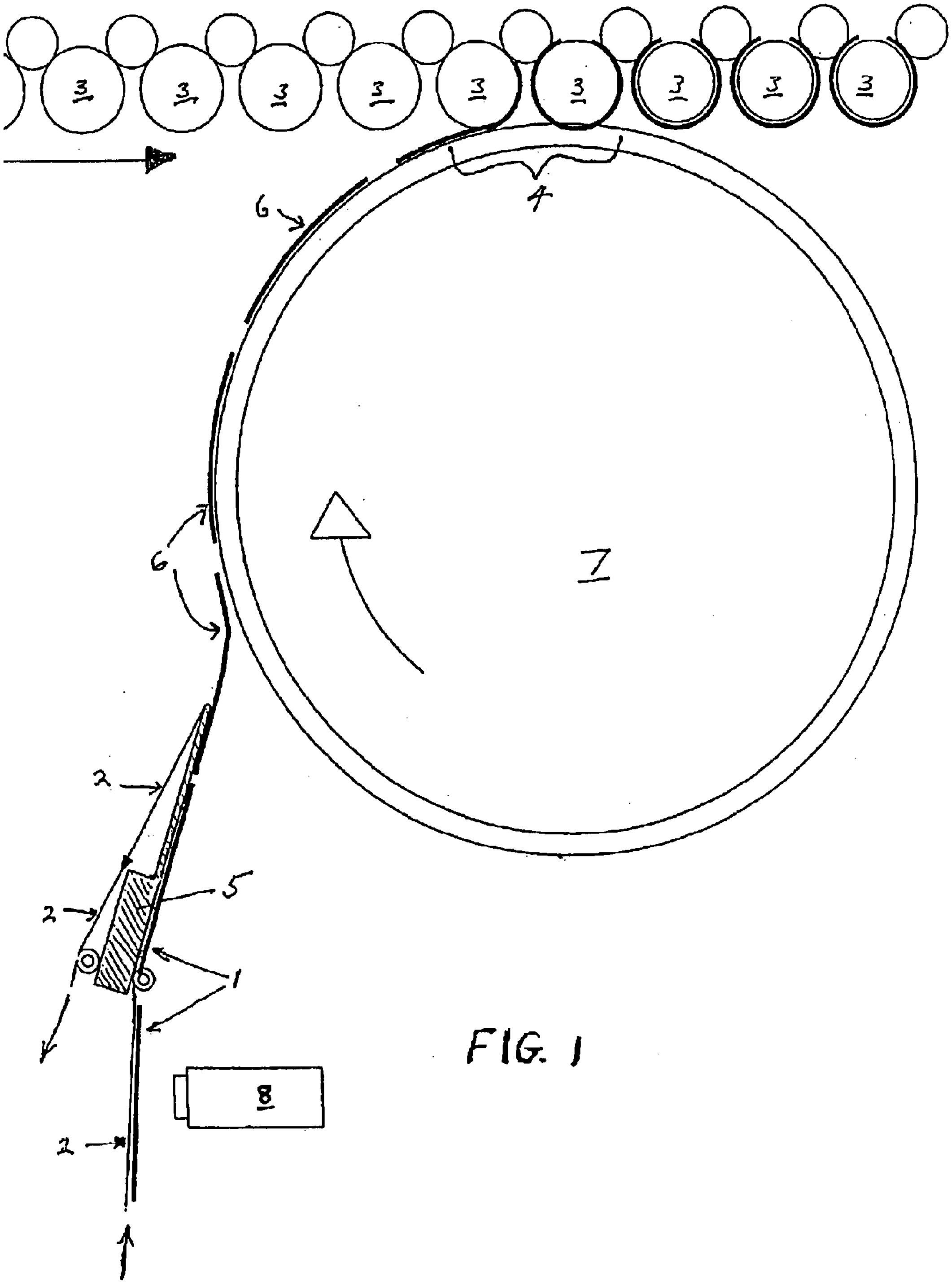
FIG. 1 is a schematic representation of prior art labeling systems.

Pressure sensitive labels are fed from a label pick-up station (5) onto a vacuum drum (7) as described above with regard to the prior art. The drum is servo-driven and in synchronization with a container that is traveling down a conveyor system toward label application site (4). The vacuum drum (7) applies the labels to containers (3). Each label is scanned one by one with a vision camera system (8) that detects various printed items on the label. If any of these items is incorrect, the label dispenser at label pick-up station (5) will still dispense the incorrect/faulty label onto the vacuum drum (7) but the incorrect/faulty label will be electronically tracked, even though dispensed along with good labels onto the vacuum drum (7).

Figure 2:
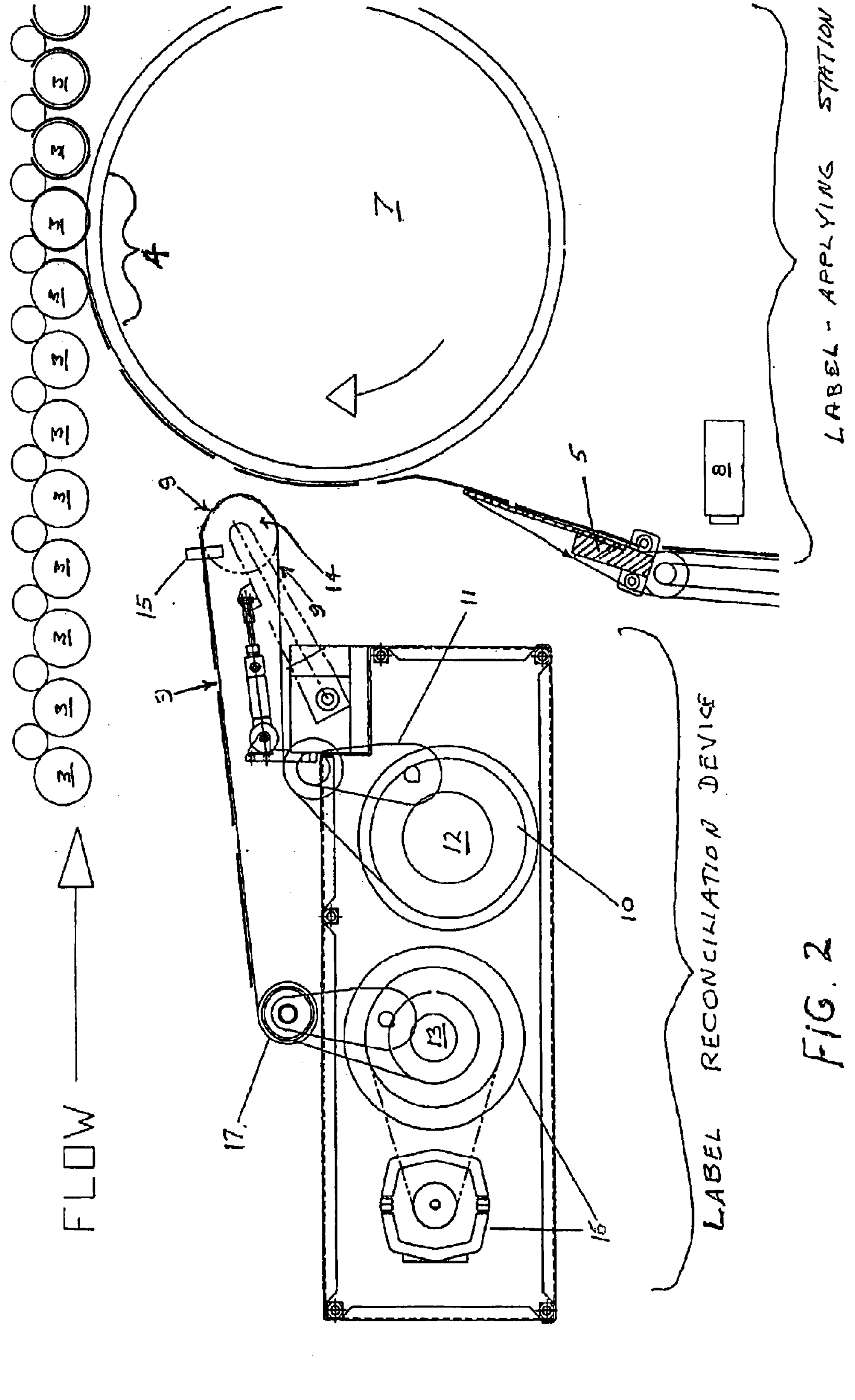
FIG. 2 illustrates the system of the present invention in an inactive state, i.e. at a time when no incorrect/faulty label has yet been detected or, if detected, the incorrect/faulty label has not yet reached the point of removal.
Figure 3:
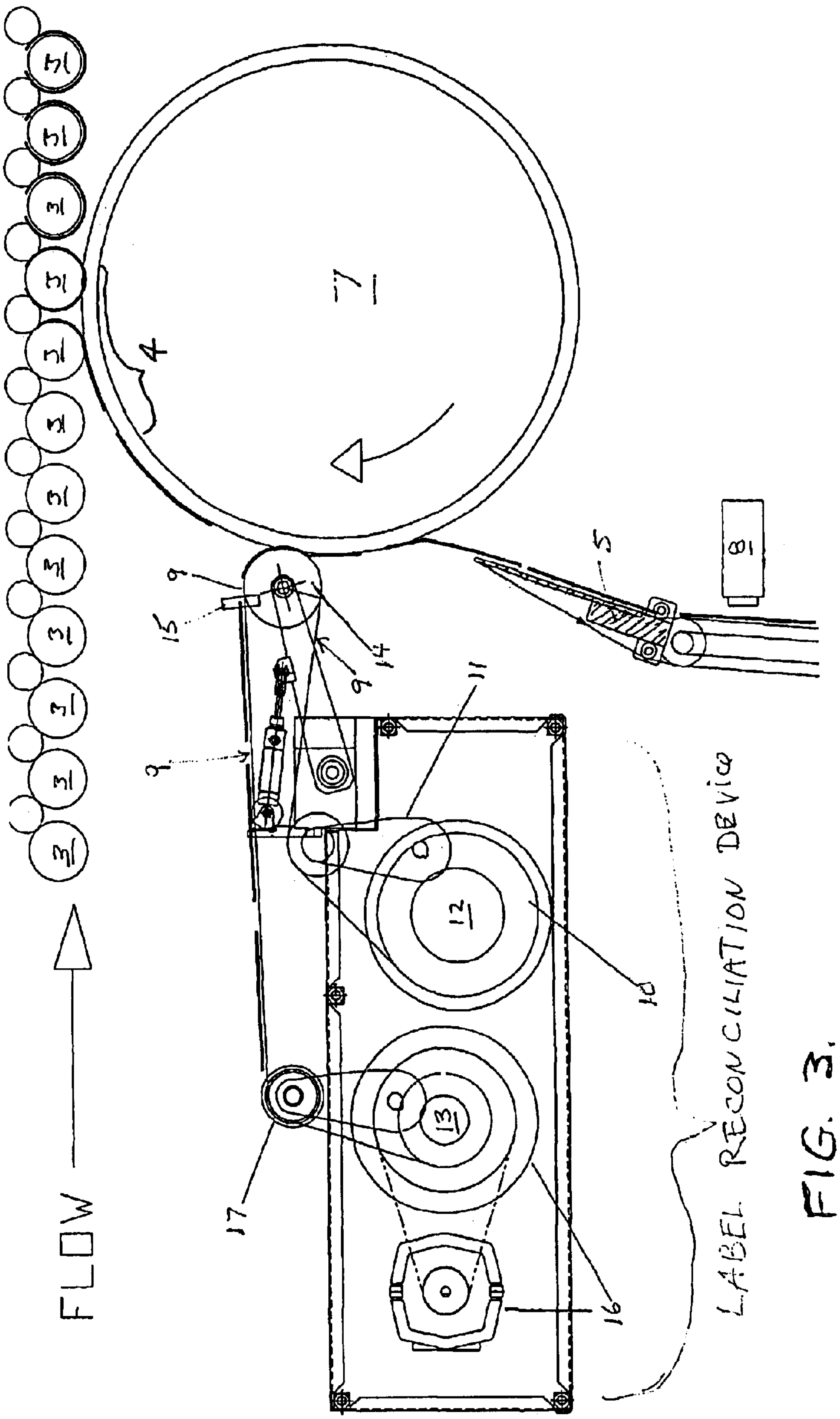
FIG. 3 is an illustration of the present invention in which the label-removal device is activated for the removal of an incorrect/faulty label.

The tracked, incorrect/faulty label will be removed from the vacuum drum (7) by a suitable pick-off assembly (14) actuating against a second web such as a paper web, and the picked-off incorrect/faulty label will be delivered and adhered to the second web (9). The pick-off assembly may comprise an actuating arm terminating in a roller, as shown in FIGS. 2 and 3, or may terminate in a low-friction bearing surface; in either case, the second web is free to move easily between the unwind spool (10) and the rewind assembly (13). The second web (9) is fed via the unwind spool (10) and a dancer arm assembly (11) that ensures tension of the second web between the unwind assembly (12) and the rewind (13). When the pick-off assembly (14) is actuated, it pushes the second web against adhesive surface of the faulty label on the drum (7). When the pick-off roller assembly (14) is actuated, the unwind dancer arm (11) will release a friction belt, enabling the unwind spool (10) to spin. Vacuum drum (7) will transport the label, and will also drive second web (9) which will in turn drive the label pick-off roller (14). When an incorrect/faulty label is detected, it is transferred from the vacuum drum onto the second web (9). Scanner (15) is essentially a counter/rejected label verifier that detects each transferred label to ensure that the label has been removed from vacuum drum (7) and that the number of labels removed corresponds to the number of incorrect/faulty labels detected. A torque or servo motor rewind system (16) and dancer arm (17) take up the excess web material together with the adhered faulty label that is being pushed by the vacuum drum. After the label is applied to web (9), the pick-off roller assembly (14) is deactivated and returns to it unengaged position. The gap between incorrect labels on the second web can be determined by the length of time that the pick-off roller assembly (14) is activated. The user can reconcile the incorrect labels visually on the second web, on the wound web roll, or on the unwound web roll to ensure that the label counters are correct, without the necessity and time associated with separating the stack of incorrect/faulty labels adhering to each other from the take-off roll of the U.S. Pat. No. 5,405,482 patent. These rolls may also be used as a permanent record of reconciliations and fault corrections. Optionally, it is possible to replace scanner (15) with a reconciling scanner similar to scanner (8) or use such in addition to scanner (15). It this case, the reconciling scanner would be looking for a correct label mixed in with the incorrect/faulty labels on web (9). When a correct label is detected, the reconciling scanner can send a signal to shut down the line until the error in the labeled containers is correspondingly corrected or other wise notify the operator of the error.

Figure 4:
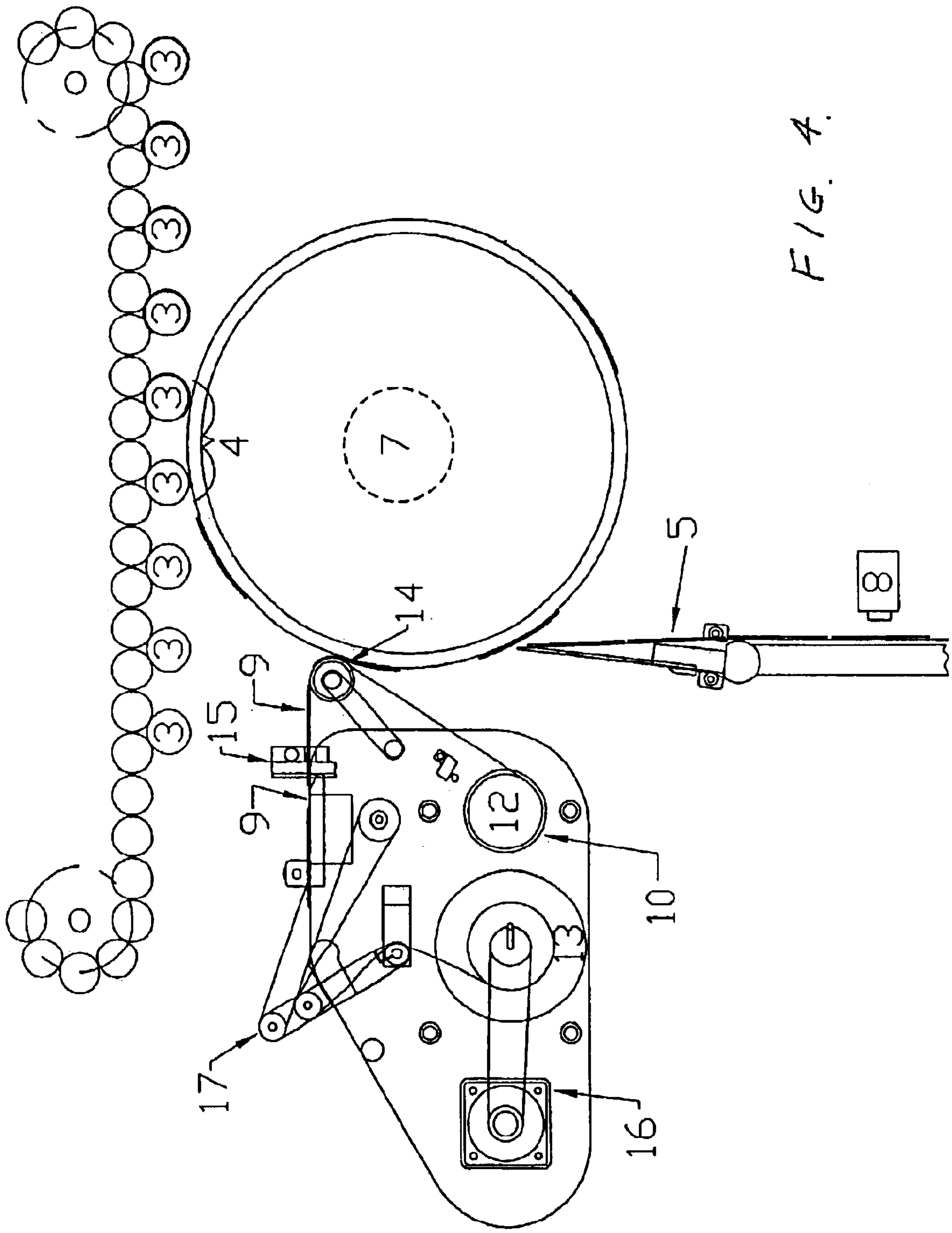
FIG. 4 illustrates a preferred embodiment of the present invention.
Figure 5:
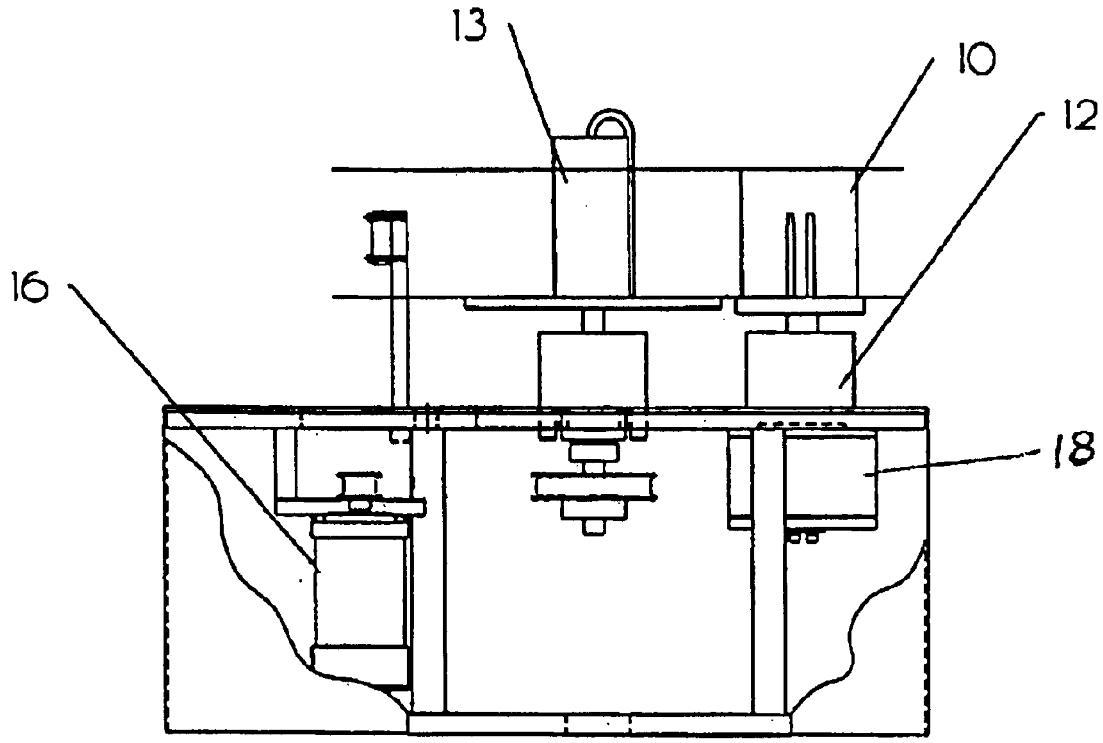
FIG. 5 is a front elevation in partial section of the preferred embodiment of FIG. 4, and showing the location of the torque clutch relative to the unwind mechanism.

A preferred embodiment of the present invention is illustrated in FIGS. 4 and 5. In the embodiment of FIGS. 2 and 3, the unwind spool (10) an (11) co-acted to maintain tension of the second web between the unwind assembly (12) and the rewind assembly (13). As shown in FIGS. 4 and 5, dancer arm assembly (11) has been eliminated, and a torque clutch (18) has been added to the unwind assembly (12), thereby providing a simpler and more efficient manner of controlling tension in the second web.

What is claimed is:

1. In a method for applying adhesive-backed labels to moving articles in which individual labels are carried by a web and transferred to a vacuum drum, and from said vacuum drum are transferred to articles to be labeled and wherein faulty labels are identified by a scanner while the labels are still on said web, and in which faulty labels are removed from said vacuum drum prior to application to one of said articles on the basis of information obtained during said scanning, the improvement which comprises removing said faulty label by pressing against the adhesive surface of said faulty label a second web that is moved at substantially the same tangential speed at its point of contact with the adhesive label as the tangential speed of the vacuum drum at the point of contact, and thereafter removing said second web away from said vacuum drum, thereby moving said faulty label with said second web, and thereafter scanning said second web to verify and reconcile faulty label removal.

2. In a labeling system adapted to apply pressure-sensitive, adhesive-backed labels to articles at a label-applying station comprising a means for delivering articles to be labeled to said label-applying station and means for delivering pressure-sensitive, adhesive backed labels to said label-applying station into juxtaposition with articles to be labeled such that the adhesive side of the said adhesive-backed label intimately contacts and adheres to said contacted article, said label-delivery means comprising a vacuum drum adapted to hold adhesive-backed labels on said vacuum drum by vacuum means with the adhesive side of said label facing away from the surface of said vacuum drum, and further comprising an adhesive label delivery means adapted to deliver adhesive-backed labels to said vacuum drum with the nonadhesive surface of said label being placed on said drum, said adhesive-backed label delivery system comprising a web delivery system adapted to receive and hold labels affixed hereto by the label adhesive and to be readily stripped therefrom, and a stripping means for removing labels adhered to said web and depositing them on said vacuum drum with the nonadhesive surface of the label contacting the surface of said vacuum drum, the improvement which comprises: (a) scanning means positioned in advance of said stripping means adapted to both identify faulty labels and the position of faulty labels relative to other labels being delivered to the vacuum drum and ultimately to the adhesive-backed label application means, and further adapted to send an electronic signal as to the fact of the existence of a faulty label and the position of said faulty label; (b) a label removal means positioned between said stripping means and said label application means for removing faulty labels from said vacuum drum upon the receipt of said electronic signal from said scanner, said label removable means comprising a second continuous web adapted to be pressed against the adhesive surface of an identified faulty label, and to be remove from contact once adherence is effected, said second web being moved at the time of contact with said faulty label at a rate coordinated with the tangential rate of movement of said label on said vacuum drum at the point of contact, and (c) scanning means subsequent to the initial point of contact between said second web and said faulty adhesive label for individually counting removed faulty labels and for verification of and reconciliation with the received information concerning faulty labels.

* * * * *